US008471686B2

United States Patent
Park et al.

(10) Patent No.: US 8,471,686 B2
(45) Date of Patent: Jun. 25, 2013

(54) REMOTE CONTROL APPARATUS WITH DIALING SCHEME PROVIDING HAPTIC SENSATIONS

(75) Inventors: Wanjoo Park, Goyang-si (KR); Laehyun Kim, Seoul (KR); Sehyung Park, Seoul (KR); Hyunchul Cho, Ulsan (KR); Seungjae Shin, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 436 days.

(21) Appl. No.: 12/911,477

(22) Filed: Oct. 25, 2010

(65) Prior Publication Data

US 2011/0102145 A1    May 5, 2011

(30) Foreign Application Priority Data

Oct. 30, 2009   (KR) .......................... 10-2009-0104035

(51) Int. Cl.
  *G08C 19/16*   (2006.01)
(52) U.S. Cl.
  USPC ..................................................... 340/12.22
(58) Field of Classification Search
  USPC ....... 340/12.22, 6.1, 426.13, 5.61; 348/14.05; 345/156, 161; 341/176
  See application file for complete search history.

(56) References Cited

U.S. PATENT DOCUMENTS

| 6,693,622 | B1 * | 2/2004 | Shahoian et al. | ............. | 345/156 |
| 6,956,558 | B1 * | 10/2005 | Rosenberg et al. | ........... | 345/156 |
| 2007/0287506 | A1 | 12/2007 | Kim et al. | | |
| 2010/0270089 | A1 | 10/2010 | Kyung et al. | | |

FOREIGN PATENT DOCUMENTS

| EP | 1184982 A1 | 3/2002 |
| KR | 10-0753041 | 8/2007 |
| KR | 10-2009-0032208 | 4/2009 |
| KR | 10-2009-0036741 | 4/2009 |

\* cited by examiner

*Primary Examiner* — Vernal Brown
(74) *Attorney, Agent, or Firm* — NSIP Law (57) ABSTRACT

A remote control apparatus that provides haptic sensations. The remote control apparatus includes a dial, a motor, a rotary encoder, an encoder counter, a control unit and a motor controller. The remote control apparatus further includes a storage unit, a movement detection unit and a display unit. When a user selects an icon displayed on the display unit by rotating the dial, the control unit interprets the user instruction through the rotary encoder and the encoder counter to control the motor to generate torque for causing a haptic sensation corresponding to the interpreted instruction via the motor controller. While the haptic sensation is conveyed to the user through the dial, the control unit controls an appliance to perform the interpreted instruction thereon.

8 Claims, 5 Drawing Sheets

FIG. 6 though tactile sensation in standardized manners in comparison with those of information recognized through visual and auditory senses. For this reason, applying tactile sensations to a user interfacing field may be less active than applying visual and auditory senses to that field.

REMOTE CONTROL APPARATUS WITH DIALING SCHEME PROVIDING HAPTIC SENSATIONS

CROSS-REFERENCE TO RELATED APPLICATIONS

The present application claims priority from Korean Patent Application No. 10-2009-0104035 filed on Oct. 30, 2009, the entire subject matter of which is incorporated herein by reference.

TECHNICAL FIELD

The present disclosure generally relates to an apparatus providing a tactile sensation to a user, and more particularly to a remote control apparatus with a dialing scheme for providing visual information through a display unit as well as haptic sensations to the user through the dialing scheme.

BACKGROUND

Recently, more attention is given to a cutaneous sensation, i.e., a tactile sensation, as a potential communication channel in a human body suitable for recognizing information from the outer world. The propagation of a stimulus through a tactile sensation in a human body may be up to 20 milliseconds which is five times faster than that of a stimulus through a visual sense. In spite of this outstanding advantage, there may be only a few ways of processing information recognized through tactile sensation in standardized manners in comparison with those of information recognized through visual and auditory senses. For this reason, applying tactile sensations to a user interfacing field may be less active than applying visual and auditory senses to that field.

In the realities of life, humans may recognize information from the outer world through the five senses, such as through visual senses, auditory senses, tactile sensation, senses of taste and olfactory senses. Nowadays, there are many attempts to apply the five senses of humans to a user interface between humans and computerized or network-based arrangements. Among such attempts, haptic technology may have the most prominent applicability to a user interface because tactile sensations enable a bidirectional communication between humans and computerized or network-based arrangements.

Meanwhile, a remote control capable of implementing multiple functions has emerged from the inconveniences in controlling various appliances, such as television sets, video record players, audio components, personal computers and the like, by using control devices dedicated thereto. The various appliances may be easily plugged into a conventional home or local network. On account of the emergence of such a remote control, various appliances may be activated and operated under the control of one controlling source. In order to realize such a remote control having a slim size, an integrated control board has been developed. This multifunctional remote control, however, may have intrinsic disadvantages due to having a plurality of buttons for use in instructing and performing multiple functions on appliances and the increase in physical size for accommodating a plurality of buttons.

As display technology progresses, a touch screen or touch panel has been introduced to address the mentioned disadvantages. Unfortunately, another disadvantage may exist due to the downsizing limitation of buttons, which should be displayed as graphical objects on the touch screen in fingerpressable sizes, for use in functions requiring fine adjustments, e.g., volume, luminance and the like.

SUMMARY

As an alternative strategy to address such disadvantages mentioned above, a mechanical dialing scheme may be adopted to the multifunctional remote control. The mechanical dialing scheme may be advantageous over past technologies used for fine adjustments of these functions.

Embodiments of a remote control apparatus providing haptic sensations include a rotatable member configured to receive an instruction from a user through a user dial and provide haptic feedback to the user; an actuating unit coupled to the rotatable member, the actuating unit configured to generate a rotational force in response to the user dial and torque causing the rotatable member to provide a haptic feedback to the user; a pulse generating unit coupled to the actuating unit, the pulse generating unit configured to generate pulses corresponding to the rotational force from the actuating unit; a pulse counting unit coupled to the pulse generating unit, the pulse counting unit configured to count the pulses to generate a pulse count value; a control unit coupled to the pulse counting unit, the control unit configured to calculate a rotational angle in degrees of the rotatable member based on the pulse count value, generate a control signal that corresponds to the calculated rotational angle, and generate an operation control signal for performing the instruction from the user on a corresponding appliance being controlled by the remote control apparatus; and an actuating controller coupled to the control unit, the actuating controller configured to generate a waveform signal in response to the control signal, wherein the actuating unit generates torque in response to the waveform signal.

This Summary is provided to introduce a selection of concepts in a simplified form that are further described below in the Detailed Description. This Summary is not intended to identify key or essential features of the claimed subject matter, nor is intended to be used in determining the scope of the claimed subject matter.

DETAILED DESCRIPTION

A detailed description may be provided with reference to the accompanying drawings. One of ordinary skill in the art may realize that the following description is illustrative only and is not in any way limiting. Other embodiments of the present invention may readily suggest themselves to such skilled persons having the benefit of this disclosure.

Figure 1:
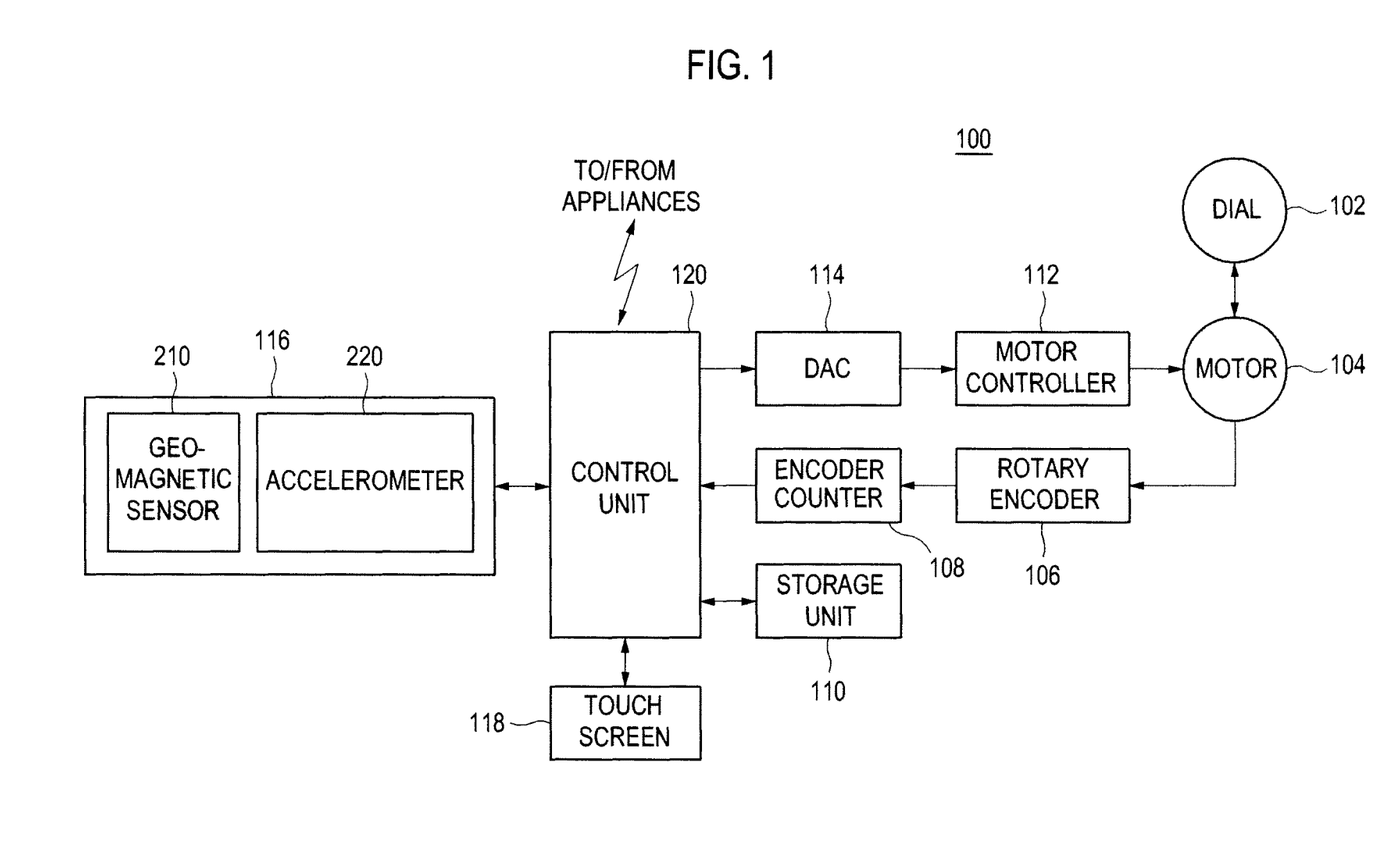
FIG. 1 is an illustrative schematic block diagram of a remote controller with a dial providing haptic sensations to a user in accordance with an embodiment of the present disclosure.

Referring to FIG. 1, there is shown an illustrative schematic block diagram of a remote controller 100 with a dial 102 providing haptic sensations to a user in accordance with an embodiment of the present disclosure. As shown in FIG. 1, the remote controller 100 may include a motor 104, a rotary encoder 106, an encoder counter 108, a storage unit 110, a control unit 120, a digital-to-analog converter (DAC) 114, and a motor controller 112. The remote controller 100 may further include the dial 102, a touch screen 118 and a movement detection unit 116. The remote controller 100 may be configured to interface through wireless communication channels with appliances (not shown). For example, the remote controller 100 may be configured to interface with the appliances through a wireless local area network (LAN), such as Infrared Data Association (IrDA), IEEE 802.11, Bluetooth, ZigBee or the like. The wireless LAN may have high flexibility so that the appliances will be conveniently added and/or deleted in such wireless communication environment. The appliances may include television sets, video record players, audio components, personal computers, computerized or network-based arrangements and the like.

The motor 104 may be coupled to a shaft (not shown) of the dial 102 and the rotary encoder 106. The motor 104 may be configured to generate rotational force according to the rotation of the dial 102 caused by the user. Further, in response to a waveform signal from the motor controller 112 under the control of the control unit 120, the motor 104 may be configured to generate torque. The torque may cause the dial 102 to generate and impart a haptic feedback to the user as a haptic sensation. For example, the haptic sensations may include a jog feeling, a serrated feeling, a rotational resistance feeling, a barrier feeling, a trembling and the like. Instead of the motor 104, any actuators capable of generating torques may be employed.

The rotary encoder 106 may be connected to the encoder counter 108. The rotary encoder 106 may be configured to generate pulses in response to the rotational force from the motor 104 and then transmit the generated pulses to the encoder counter 108.

The encoder counter 108 may be connected to the control unit 120 through, e.g., a general purpose input/output (GPIO) provided therein. The encoder counter 108 may be configured to count the pulses from the rotary encoder 106 and generate a pulse count value corresponding to the number of pulses.

The control unit 120 may be connected to the DAC 114, the encoder counter 108, the storage unit 110, the touch screen 118 and the movement detection unit 116. The control unit 120 may be configured to calculate a rotation angle in degrees of the dial 102 caused by the user based on the pulse count value from the encoder counter 108. Thereafter, the control unit 120 may be configured to generate a control signal with reference to haptic information stored in the storage unit 110 and transmit the generated control signal to the DAC 114. The control signal may include data related to the kinds of haptic feedbacks and a waveform signal having a voltage range and a duration for use in generating torque on the motor 104.

Further, the control unit 120 may be configured to transmit an operation control signal to the appliances through, e.g., a universal asynchronous receiver/transmitter (UART). The operation control signal may function to perform operations designated by the user on the appliances. For example, the operations may include turning on and off the appliances, selecting a channel, turning up and down the volume, and the like, which are capable of being performed on the appliances.

The DAC 114 may be connected to the motor controller 112. The DAC 114 may be configured to receive the control signal from the control unit 120 and convert it from digital to analog, thereby sending the converted control signal to the motor controller 112.

The motor controller 112 may be connected to the motor 104. The motor controller 112 may be configured to receive an analog control signal from the DAC 114. Then, in response to the control signal, the motor controller 112 may be configured to generate a waveform signal and transmit it to the motor 104. Then, in response to the waveform signal, the motor 104 may be driven to generate torque according to the waveform signal having a predetermined voltage range and a predetermined duration suitable for realizing a haptic feedback defined in the control signal. For example, the waveform signal may have a voltage range from −10 volt (V) to +10 V and a duration ranging up to 1000 milliseconds (ms). The torque may be the force for rotating the dial 102 such that a haptic feedback generated according to the waveform signal may be conveyed to the user through the dial 102. Therefore, the user may feel a haptic sensation that corresponds to the haptic feedback induced by the motor 104 through the dial 102.

The storage unit 110 may be connected to the control unit 120. The storage unit 110 may be configured to store the haptic information. The haptic information may include data in relation to haptic feedback for realizing the haptic sensations through the motor 104 and the dial 102. As described above, the haptic feedback may be changed as the waveform signal to be applied to the motor 104 from the motor controller 112 changes. Also, the storage unit 110 may be configured to store operation control information in relation to operations to be designated by the user, which are capable of being executed on the appliances. This operation control information may further include data for activating and controlling the appliances through user commands. Such operation control information may be displayed on the touch screen 118 in the form of graphical representations. These graphical representations associated with the operation control information may include menu categories, icons, buttons and the like. Displaying of the operation control information may be performed simultaneously while the haptic feedback is conveyed to the user and/or the operation is designated by the user and performed on the corresponding appliance.

The touch screen 118 may be connected to the control unit 120 through, e.g., the UART. The touch screen 118 may be configured to display the operation control information under the control of the control unit 120. The touch screen 118 may be further configured to display graphical objects representative of the appliances to be controlled through the remote controller 100. To help the user's command operation, the touch screen 118 may be configured to display data in association with the rotation angle in degrees of the dial 102 in a predetermined graphical manner.

The movement detection unit 116 may be connected to the control unit 120 through, e.g., an analog-to-digital converter (ADC). The movement detection unit 116 may be configured to include a geomagnetic sensor 210 and an accelerometer 220. The movement detection unit 116 may be configured to detect spatial movements of the remote controller 100, which may be caused by the user, under the control of the control unit 120. For example, the spatial movements of the remote controller 100 may include yawing, rolling, swing, shaking and the like. The spatial movements may be defined or linked to operations to be performed on the appliances. The movement detection unit 116 may be configured to generate a detection signal based on the detected spatial movements to transmit the generated detection signal to the control unit 120. Thereafter, in response to the detection signal, the control unit 120 may generate an operation control signal for activating a corresponding appliance and performing an operation designated by the user thereon. To expand the user's intuitive knowledge to current operation statuses of the respective appliances, the control unit 120 may allow the touch screen 118 to display thereon a series of processes in the form of, e.g., graphical representations, which are currently designated by the user and/or performed on the appliances.

The detection signal generated in the movement detection unit 116 may include geomagnetic data from the geomagnetic sensor 210 and acceleration data from the accelerometer 220. The geomagnetic sensor 210 of the movement detection unit 116 may be configured to generate geomagnetic data based on the variation of magnetic flux density which are dependent upon movements of the remote controller 100. The accelerometer 220 of the movement detection unit 116 may be configured to detect the acceleration of the remote controller 100 in three-directions, e.g., X-, Y- and Z-directions, and generate acceleration data based on the detected acceleration.

In an exemplary embodiment, the geomagnetic sensor 210 of the movement detection unit 116 may be configured to include a coil forming a reference magnetic field of the remote controller 100 and measure horizontal and vertical components Vx− and Vy− of the earth's magnetic field. Also, the geomagnetic sensor 210 may be configured to measure horizontal and vertical components Vx+ and Vy+ of the reference magnetic field of the remote controller 100, and generate geomagnetic data based on differences of the horizontal and vertical components between the reference magnetic field and the earth's magnetic field.

In another exemplary embodiment, the accelerometer 220 of the movement detection unit 116 may be configured to include three servo accelerometers for detecting acceleration of the remote controller 100 in three-directions. After detecting the acceleration, the accelerometer 220 may be configured to generate acceleration data based on the detected acceleration.

For example, if the remote controller 100 is twisted by the user, the movement detection unit 116 may detect the twisting movement of the remote controller 100 through the geomagnetic sensor 210 and the accelerometer 220 to generate geomagnetic data and acceleration data corresponding to the twisting movement detected. In response to the detection signal including the geomagnetic data and the acceleration data from the movement detection unit 116, the control unit 120 may be configured to generate an operation control signal for operating a predetermined operation that defines the twisting movement in a corresponding appliance and transmit the operation control signal thereto. If the twisting movement of the remote controller 110 is defined as an operation of turning down the volume of a television set, the control unit 120 may be configured to generate an operation control signal corresponding to the turning-down the volume to be transmitted to the television set.

Figure 2A:
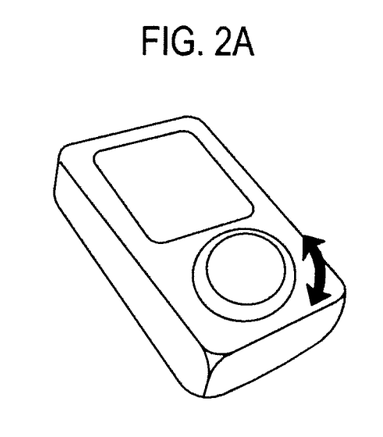
FIGS. 2A to 2C are illustrative diagrams of the remote controller in accordance with embodiments of the present disclosure.
Figure 2B:
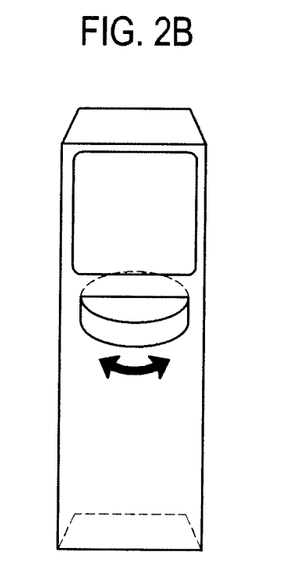
Figure 2C:
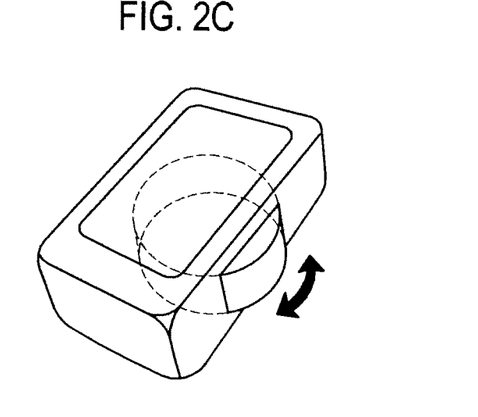

Hereinafter, a haptic sensation in accordance with the present disclosure will be described. The dial 102 may be connected to the motor 104 to convey a haptic feedback caused by the torque from the motor 104 to the hand of the user gripping the remote controller 100. Thus, the user may feel the haptic feedback as a haptic sensation through dial 102 of the remote controller 100. In exemplary embodiments, as shown in FIGS. 2A to 2C, the dial 102 may be positioned on a front side of the remote controller 100 in vertical or horizontal directions and a lateral side thereof, but not limited thereto.

As described above, the haptic information may be stored in the storage unit 110 as values corresponding to waveform signals having voltage ranges and durations to be applied to the motor 104. The haptic information may be changed and stored in the storage unit 110 according to the user's command.

The torque to be generated from the motor 104 may be established according to the haptic information for conveying various haptic sensations, such as a jog feeling, a serrated feeling, a rotational resistance feeling, a barrier feeling, a trembling and the like to the user. With reference to FIGS. 3 to 6, embodiments of the haptic feedback according to waveform signals applied to the motor 104 will be described below.

Figure 3:
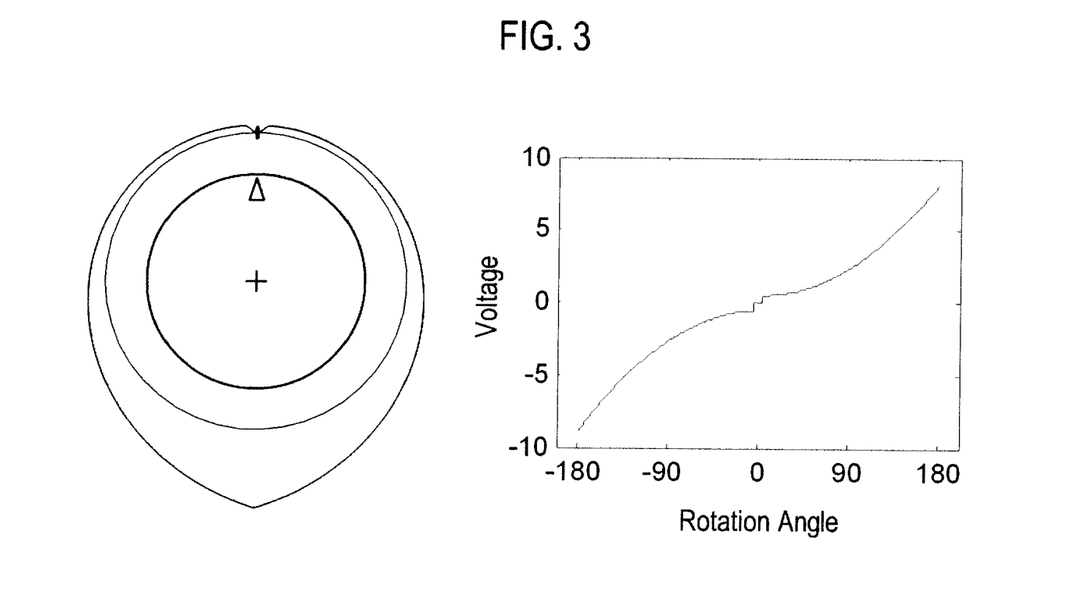
FIG. 3 is a graphical illustration of a haptic feedback of a jog feeling and a graph showing the relationship between a rotation angle of the dial and a voltage of a waveform signal fed to a motor for generating the haptic feedback in accordance with an embodiment of the present disclosure.

In an exemplary embodiment, as shown in FIG. 3, a haptic sensation of a jog feeling may be realized by a haptic feedback of a restoration force when the dial 102 is rotated by the user in a left or right direction from its origin position. For example, torque according to a waveform signal having a voltage range from −9 V (volts) to 0 V may be generated at a rotation angle between −180 and zero degrees of the dial 102. Further, torque according to a waveform signal having a voltage range from 0 V to 9 V may be generated at a rotation angle between zero and 180 degrees of the dial 102. In response to the rotation of the dial 102 in the left or right direction, under the control of the control unit 120, the touch screen 118 may be configured to display graphical representations, such as described above, in synchronization with the rotation of the dial 102. As such, the user may conveniently select one of the displayed graphical representations in order to activate a desired operation to be performed on a specific appliance that is controlled through the remote controller 100.

Figure 4:
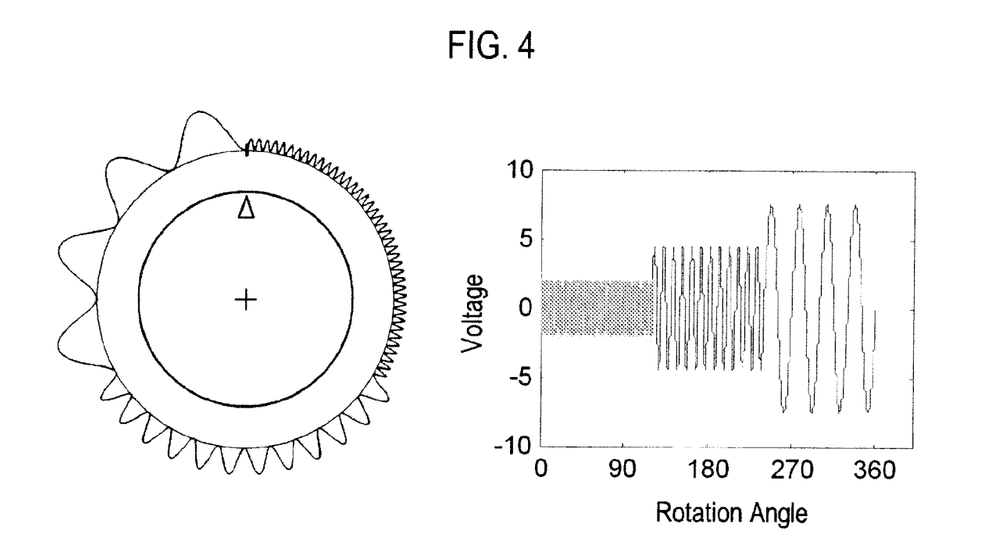
FIG. 4 is a graphical illustration of a haptic feedback of a serrated feeling and a graph showing the relationship between a rotation angle of the dial and a voltage of a waveform signal fed to the motor for generating the haptic feedback in accordance with an embodiment of the present disclosure.

In another exemplary embodiment, as shown in FIG. 4, haptic sensations providing a serrated feeling may be realized by haptic feedbacks according to waveform signals having voltage ranges, which are established with respect to predetermined rotation angle ranges of the dial 102. For example, the rotation angle of the dial 102 may be divided into three ranges, i.e., 0 to 120 degrees, 121 to 240 degrees and 241 to 360 degrees. If an audio component, a personal computer and a television set are designated to the rotation angle ranges of 0 to 120 degrees, 121 to 240 degrees and 241 to 360 degrees, respectively, torques corresponding to the respective rotation angle ranges may be generated according to waveform signals having different voltage ranges and durations for causing different haptic feedbacks, each of which makes a different haptic sensation providing a serrated feeling.

If the user selects the audio component by rotating the dial 102 between 0 to 120 degrees, a waveform signal having a voltage range from −2 V to +2 V and a duration of 5 ms may be applied from the motor controller 112 to the motor 104. In response to the waveform signal from the motor controller 112, the motor 104 may generate torque to deliver to the dial 102. Therefore, a haptic feedback according to the torque may be conveyed to the user through the dial 102 as a haptic sensation providing a serrated feeling corresponding to the audio component selection. This haptic feedback may be consecutively repeated, e.g., 20 times.

When the user selects the television set by rotating the dial 102 between 241 to 360 degrees, a waveform signal having a voltage range from −8 V to +8 V and a duration of 100 ms may be applied from the motor controller 112 to the motor 104. In response to the waveform signal from the motor controller 112, the motor 104 may generate torque to deliver to the dial 102. Thus, a haptic feedback according to the torque may be imparted to the user through the dial 102 as another haptic sensation providing a serrated feeling corresponding to the television selection. This haptic feedback may be consecutively repeated, e.g., 5 times.

If the user selects the personal computer by rotating the dial 102 between 121 to 240 degrees, a waveform signal having a voltage range from −5 V to +5 V and a duration of 50 ms may be applied from the motor controller 112 to the motor 104. In response to the waveform signal from the motor controller 112, the motor 104 may generate torque to deliver to the dial 102. And thus, a haptic feedback according to the torque may be conveyed to the user through the dial 102 as yet another haptic sensation providing a serrated feeling corresponding to the personal computer selection. This haptic feedback may be consecutively repeated, e.g., 10 times.

Alternatively, the rotation angle ranges of the dial 102 may be unevenly divided based on the usage frequencies of the appliances. For example, if the personal computer is frequently used more than the audio component and the television set, the rotation angle range of the dial 102 assigned to the personal computer may be wider than those assigned to the audio component and the television set. In this case, torque corresponding to the wider rotation angle range may be generated according to a waveform signal having a voltage range greater than those of the narrow rotation angle ranges.

Figure 6:
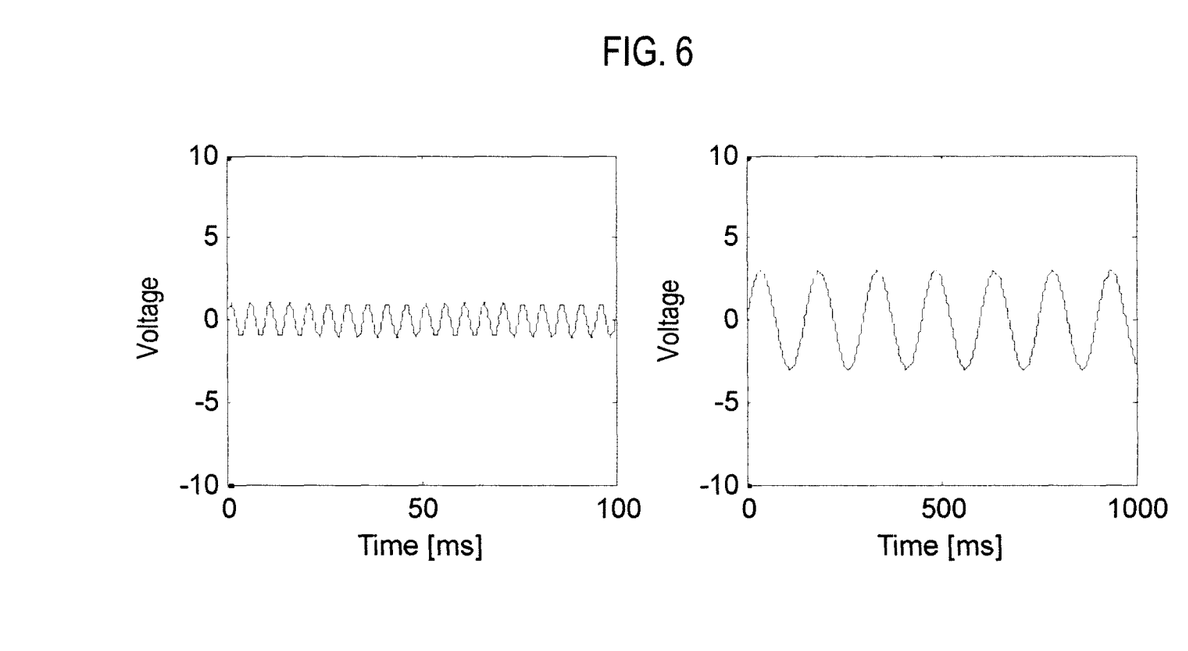
FIG. 6 is an illustrative diagram showing the relationship between voltages and durations of waveform signals fed to the motor for generating a haptic feedback of trembling in accordance with an embodiment of the present disclosure.

In yet another exemplary embodiment, if the user selects the television set by rotating the dial 102 among the appliances, the touch screen 118 may be configured to display program categories associated with the television set for enabling the user to select and activate a television program, e.g., a movie program, a sports program, a music program, a shopping program or the like. As shown in FIG. 6, waveform signals having different voltage ranges and durations, each of which is designated to the respective program categories, may be applied to the motor 104. This may direct the motor 104 to generate torque corresponding to each of the different haptic feedbacks which convey different haptic sensations such as a serrated feeling to the user. For example, as for a program category having a high usage frequency, the motor 104 may be configured to generate torque according to a waveform signal (the diagram to the right in FIG. 6) having a voltage range and a duration specified to that program category. As for another program category having a low usage frequency, the motor 104 may be configured to generate torque according to a waveform signal (the diagram to the left in FIG. 6) having a voltage range and a duration specified to the other program category. Therefore, while the program categories are displayed, the user may intuitively recognize the usage frequency of each program category through the different haptic feedbacks conveyed from the dial 102. In another example, unlike the waveform signals shown in FIG. 6, torque according to waveform signals having the same voltage ranges and different durations as specified in the respective program categories may be applied from the motor 104 to the dial 102 in order to cause different haptic feedbacks dependent upon the usage frequencies of the program categories.

Alternatively, torque for generating a haptic feedback may be differently applied from the motor 104 to the dial 102 according to the kinds of program contents included in the respective program categories. For example, a sports program of the program category may include a soccer program, a baseball program, a golf program, a skating program and the like. If the user tends to select the golf program more frequently than the remaining programs in the sports program, torque according to a waveform signal having a voltage range and a duration greater than other voltages and durations may be applied to the motor 104 in order to realize a haptic sensation providing a serrated feeling which is specific to the golf program, and is different from the remaining haptic sensations that provide other serrated feeling.

In still another embodiment, different haptic sensations such as a rotational resistance feeling may be implemented when the user adjusts the sound volume according to the current status thereof. For example, if the sound volume is low, torque for generating a haptic feedback of decreasing the rotational resistance feeling may be applied to the motor 104. Otherwise, if the sound volume is high, torque for generating a haptic feedback of increasing the rotational resistance feeling may be applied to the motor 104.

Figure 5:
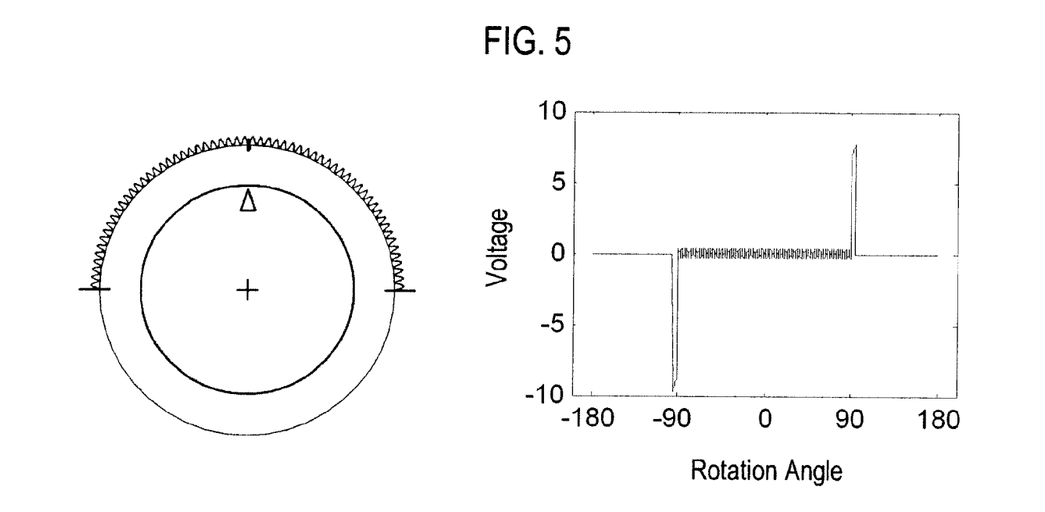
FIG. 5 is a graphical illustration of a haptic feedback of a barrier feeling and a graph showing the relationship between a rotation angle of the dial and a voltage of a waveform signal fed to the motor for generating the haptic feedback in accordance with an embodiment of the present disclosure.

Alternatively, as shown in FIG. 5, a haptic sensation providing a barrier feeling may be implemented at each point of the maximum and minimum sound volumes when the user adjusts the sound volume. For example, torque according to a waveform signal having a voltage of −9 V may be applied from the motor 104 to the dial 102 near a rotation angle of −90 degrees of the dial 102, while torque according to a waveform signal having a voltage of +9 V may be applied from the motor 104 to the dial 102 near a rotation angle of +90 degrees of the dial 102. Therefore, the user may intuitively recognize the maximum and minimum sound volumes through the haptic sensations providing a barrier feeling generated near the rotation angles of −90 and +90 degrees.

In yet another embodiment, a haptic sensation of trembling may be implemented to alarm the user when there is an urgent matter. For example, if a door of a refrigerator among the appliances is still opened for a predetermined period time, torque according to a waveform signal having a low voltage range, e.g., from −2 V to +2 V, and a short duration of, e.g., 5 ms as shown in the left diagram of FIG. 6, may be consecutively applied from the motor 104 to the dial 102 in order to impart the haptic sensation of trembling to the user. If the user does not recognize the haptic sensation of trembling as an alarm, torque having a waveform signal having a high voltage range, e.g., from −8 V to +8 V, and a longer duration, e.g., 100 ms, may be consecutively applied from the motor 104 to the dial 102 in order to more definitely alarm the door opening status to the user. Alternatively, a magnitude of the torque for generating a haptic feedback corresponding to the haptic sensation of trembling may gradually be changed from low to high according to the variation of voltage range and duration of a waveform signal to be applied to the motor 104. In this case, an alarm sound may also be accompanied with the haptic sensation of trembling. It is noted that the signs of the voltage, i.e., a minus (−) and a plus (+), indicate the rotational direction of the motor 104.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A remote control apparatus providing haptic sensations, comprising:
    a rotatable member configured to receive an instruction from a user through a user dial and provide haptic feedbacks to the user;
    an actuating unit coupled to the rotatable member, the actuating unit configured to generate a rotational force in response to the user dial and torque causing the rotatable member to provide a haptic feedback to the user;
    a pulse generating unit coupled to the actuating unit, the pulse generating unit configured to generate pulses corresponding to the rotational force from the actuating unit;
    a pulse counting unit coupled to the pulse generating unit, the pulse counting unit configured to count the pulses to generate a pulse count value;
    a control unit coupled to the pulse counting unit, the control unit configured to calculate a rotational angle in degrees of the rotatable member based on the pulse count value, generate a control signal corresponding to the calculated rotational angle, and generate an operation control signal for performing the instruction from the user on a corresponding appliance being controlled by the remote control apparatus; and
    an actuating controller coupled to the control unit, the actuating controller configured to generate a waveform signal in response to the control signal,
    wherein the actuating unit generates torque in response to the waveform signal.

2. The remote control apparatus of claim 1, further comprising:
    a storage unit coupled to the control unit, the storage unit configured to store haptic information in association with the haptic feedbacks defined per the appliances and the user's instructions;
    a movement detection unit coupled to the control unit, the movement detection unit configured to detect spatial movements of the remote control apparatus and generate a detection signal corresponding to the detected spatial movements; and
    a display unit coupled to the control unit, the display unit configured to display graphical representations related to the instructions that are imparted during the haptic feedbacks to the user.

3. The remote control apparatus of claim 2, wherein the movement detection unit comprises:
    a geomagnetic sensor configured to generate geomagnetic data based on a variation of magnetic flux density dependent upon the spatial movements; and
    an accelerometer configured to detect acceleration of the remote control apparatus to generate acceleration data.

4. The remote control apparatus of claim 3, wherein the detection signal from the movement detection unit comprises the geomagnetic data and the acceleration data.

5. The remote control apparatus of claim 4, wherein the control unit is further configured to generate the control signal in response to the detection signal from the movement detection unit.

6. The remote control apparatus of claim 1, wherein the waveform signal comprises a voltage range and a duration varied according to the kind of haptic feedback, and the torque is defined by the waveform signal.

7. The remote control apparatus of claim 1, wherein the rotatable member is located on a front side of the remote control apparatus in a horizontal or vertical direction.

8. The remote control apparatus of claim 1, wherein the rotatable member is located on a lateral side of the remote control apparatus.

* * * * *